(12) United States Patent
Murakoshi et al.

(10) Patent No.: US 9,134,856 B2
(45) Date of Patent: Sep. 15, 2015

(54) APPARATUS AND METHOD FOR CONTROLLING A USER INTERFACE OF A DEVICE BASED ON VIBRATORY SIGNALS

(71) Applicant: SONY CORPORATION, Tokyo (JP)

(72) Inventors: Sho Murakoshi, San Diego, CA (US); Kazumoto Kondo, San Diego, CA (US); Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 13/736,241

(22) Filed: Jan. 8, 2013

(65) Prior Publication Data
US 2014/0191963 A1     Jul. 10, 2014

(51) Int. Cl.
G06F 3/043     (2006.01)
G06F 3/0354    (2013.01)

(52) U.S. Cl.
CPC .......... *G06F 3/0433* (2013.01); *G06F 3/03545* (2013.01)

(58) Field of Classification Search
CPC ............ G06F 3/043–3/0436; G06F 2303/041; G06F 2303/04101; G06F 2303/04105; G06F 3/03545; G06F 3/03547
USPC ..................... 178/18.01–18.04, 19.01, 19.02; 345/156–177
See application file for complete search history.

(56) References Cited

U.S. PATENT DOCUMENTS

| | | | |
|---|---|---|---|
| 8,319,746 B1 * | 11/2012 | Ho et al. | 345/173 |
| 2005/0083313 A1 | 4/2005 | Hardie-Bick | |
| 2006/0192763 A1 * | 8/2006 | Ziemkowski | 345/168 |
| 2009/0273583 A1 | 11/2009 | Norhammar | |
| 2011/0003550 A1 | 1/2011 | Klinghult et al. | |
| 2011/0018825 A1 | 1/2011 | Kondo et al. | |
| 2011/0191680 A1 | 8/2011 | Chae et al. | |
| 2011/0293102 A1 | 12/2011 | Kitazawa et al. | |
| 2011/0310028 A1 | 12/2011 | Camp, Jr. et al. | |
| 2012/0229407 A1 | 9/2012 | Harris et al. | |

\* cited by examiner

*Primary Examiner* — Nathan Danielsen
(74) *Attorney, Agent, or Firm* — Sony Corporation

(57) ABSTRACT

Certain aspects of an apparatus and a method for controlling a user interface of a device may comprise one or more sensors coupled to a vibratory surface associated with the apparatus. The one or more sensors may detect one or more vibrations of the vibratory surface caused by an interaction of an object with the vibratory surface. The one or more sensors may generate one or more vibratory signals in response to the detected one or more vibrations. One or more processors that are communicatively coupled to the one or more sensors may generate a control signal corresponding to the one or more generated vibratory signals to control the user interface of the device.

18 Claims, 8 Drawing Sheets

APPARATUS AND METHOD FOR CONTROLLING A USER INTERFACE OF A DEVICE BASED ON VIBRATORY SIGNALS

CROSS-REFERENCE TO RELATED APPLICATIONS/INCORPORATION BY REFERENCE

This application makes reference to U.S. patent application Ser. No. 13/786,641 filed on Mar. 6, 2013, which is hereby incorporated herein by reference in its entirety.

FIELD

Various embodiments of the disclosure relate to a user interface. More specifically, various embodiments of the disclosure relate to an apparatus and method for controlling a user interface of a device.

BACKGROUND

A user interface enables users to interact with devices. The user interface may be an input mechanism that enables a user to provide input to the device. The user interface may also act as an output mechanism that allows the device to indicate results of the user input. Examples of the user interface may be a button, a touch screen, a voice based user interface, a display screen, and the like. Generally, a user interface of a device may be integrated with the device or may be implemented on another device communicatively coupled to the device. Moreover, a user interface implemented using a certain technology may restrict the ways in which a user may interact with a device.

Further limitations and disadvantages of conventional and traditional approaches will become apparent to one of skill in the art, through comparison of such systems with some aspects of the present disclosure as set forth in the remainder of the present application with reference to the drawings.

SUMMARY

An apparatus and/or a method for controlling the user interface of a device substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain implementations may be found in an apparatus and/or a method for controlling a user interface of a device. The apparatus may detect one or more vibrations of a vibratory surface caused by an interaction of an object with the vibratory surface. The apparatus may generate one or more vibratory signals in response to the detected one or more vibrations. The apparatus may generate a control signal corresponding to the one or more generated vibratory signals to control the user interface of the device.

The apparatus may convert each of the generated one or more vibratory signals into vibratory signal components. Each of the converted vibratory signal components corresponds to a coordinate axis in a three-dimensional coordinate system. The apparatus may generate a first signal based on a difference between a first vibratory signal component and a second vibratory signal component of the converted three vibratory signal components. The apparatus may generate a second signal based on a difference between one of the first vibratory signal component or the second vibratory signal component and a third vibratory signal component of the converted three vibratory signal components. The apparatus may determine the interaction of the object based on the generated first signal and the generated second signal. The apparatus may determine a location corresponding to the interaction of the object with the vibratory surface. The location is determined based on the generated first signal and the generated second signal.

The apparatus may generate a sample of the generated first signal during a first pre-determined duration. The apparatus may generate a sample of the generated second signal during a second pre-determined duration. The apparatus may transform each of the generated samples of the generated first signal and the generated second signal from a time domain to a frequency domain. Each of the samples of the generated first signal and the generated second signal is generated by applying a window function to each of the generated first signal and the generated second signal. The apparatus may determine a cross-correlation between the transformed sample of the generated first signal and the transformed sample of the generated second signal. The apparatus may determine the location and/or the interaction based on the determined cross-correlation. The apparatus may determine a vibration frequency corresponding to each of the generated one or more vibratory signals based on one or more of: a material of the vibratory surface, a type of the object, a type of the interaction, and/or a roughness of the vibratory surface. The determined vibration frequency is indicative of an operation associated with the device.

Figure 1:
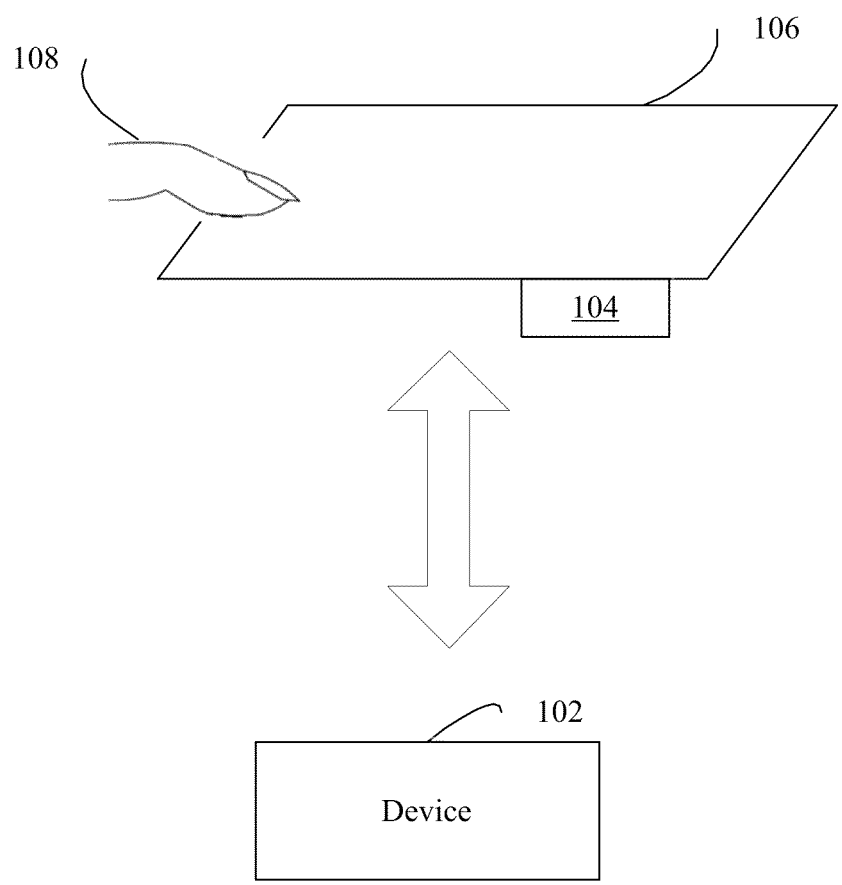
FIG. 1 is a block diagram illustrating controlling a user interface of a device based on vibratory input, in accordance with an embodiment of the disclosure.

FIG. 1 is a block diagram illustrating controlling a user interface of a device based on vibratory input, in accordance with an embodiment of the disclosure. Referring to FIG. 1, there is shown a device 102, an apparatus 104 for controlling a user interface of the device 102, a vibratory surface 106 associated with the apparatus 104, and an object 108 for interacting with the vibratory surface 106.

The device 102 may correspond to a machine that may be operated by a user. The device 102 may perform one or more operations when operated by a user. The device 102 may be an electrical device, a mechanical device, an electronic device, and/or a combination thereof. Examples of the device 102 may include, but are not limited to, mobile phones, laptops, tablet computers, televisions, Personal Digital Assistant (PDA) devices, vehicles, home appliances, media playing devices, and/or any other device operable by a user.

The apparatus 104 may comprise suitable logic, circuitry, interfaces, and/or code that may be operable to control the user interface of the device 102 based on an interaction of the object 108 with the vibratory surface 106. Based on the interaction, a user may control one or more operations of the device 102.

In an embodiment, the apparatus 104 may be communicatively coupled with the device 102 via a wired or wireless communication network. Examples of the communication network may include, but are not limited to, a Bluetooth network, a Wireless Fidelity (Wi-Fi) network, and/or a ZigBee network. In another embodiment, the apparatus 104 may be integrated with the device 102.

The vibratory surface 106 may correspond to any surface capable of generating vibrations. The vibratory surface 106 may be composed of various materials such as wood, glass, plastic, metal, cardboard, concrete, and the like. Examples of such vibratory surface 106 may include, but are not limited to, a table top, a wall, a cover of the device, and/or any surface capable of generating vibrations.

The apparatus 104 may be coupled to the vibratory surface 106. In an embodiment, the apparatus 104 may be fixed on the vibratory surface 106. For example, a table top may be used as the vibratory surface 106. The apparatus 104 may be fixed above and/or below the table top. In another embodiment, the apparatus 104 may be embedded in the vibratory surface 106. In another example, a dashboard of a vehicle may correspond to the vibratory surface 106. The apparatus 104 may be fixed to and/or embedded in the dashboard. In another embodiment, the vibratory surface 106 may be an integrated part of the apparatus 104. For example, the cover of the apparatus 104 may correspond to the vibratory surface 106. Notwithstanding, the disclosure may not be so limited and any part of the body of the apparatus 104 may correspond to the vibratory surface 106 without limiting the scope of the disclosure. In an embodiment, any part of a surface may correspond to the vibratory surface 106. For example, the entire surface of the table top to which the apparatus 104 is coupled may be designated as the vibratory surface 106. In another embodiment, a pre-defined region of a surface may correspond to the vibratory surface 106. For example, a pre-defined region of the body of the apparatus 104 may be designated as the vibratory surface 106.

A user may interact with the vibratory surface 106 in many ways using one or more objects, such as the object 108. Examples of the object 108 may include, but are not limited to, a finger of a user, a finger nail of a user, a stylus, and/or any object capable of interacting with and producing vibrations on the vibratory surface 106. Examples of the interaction of the object 108 with the vibratory surface 106 may include, but are not limited to scratching or tapping on the vibratory surface 106 using the object 108, and/or sliding or dragging the object 108 on the vibratory surface 106.

In an embodiment, the vibratory surface 106 may be a composite surface made up of different types of materials. In another embodiment, one or more properties of a region of the vibratory surface 106, such as roughness, thickness, and the like, may vary from one or more properties of another region of the vibratory surface 106. The apparatus 104 may be operable to generate different control signals that correspond to one or more interactions performed at different regions of the vibratory surface 106. For example, a region near the center of a table may have more roughness than the regions of the table near the corners. The apparatus 104 may generate a control signal to switch on a lamp placed on the table when a user may scratch on the center of the table. Similarly, a control signal that corresponds to scratching near the corners may switch off the lamp.

Figure 2:
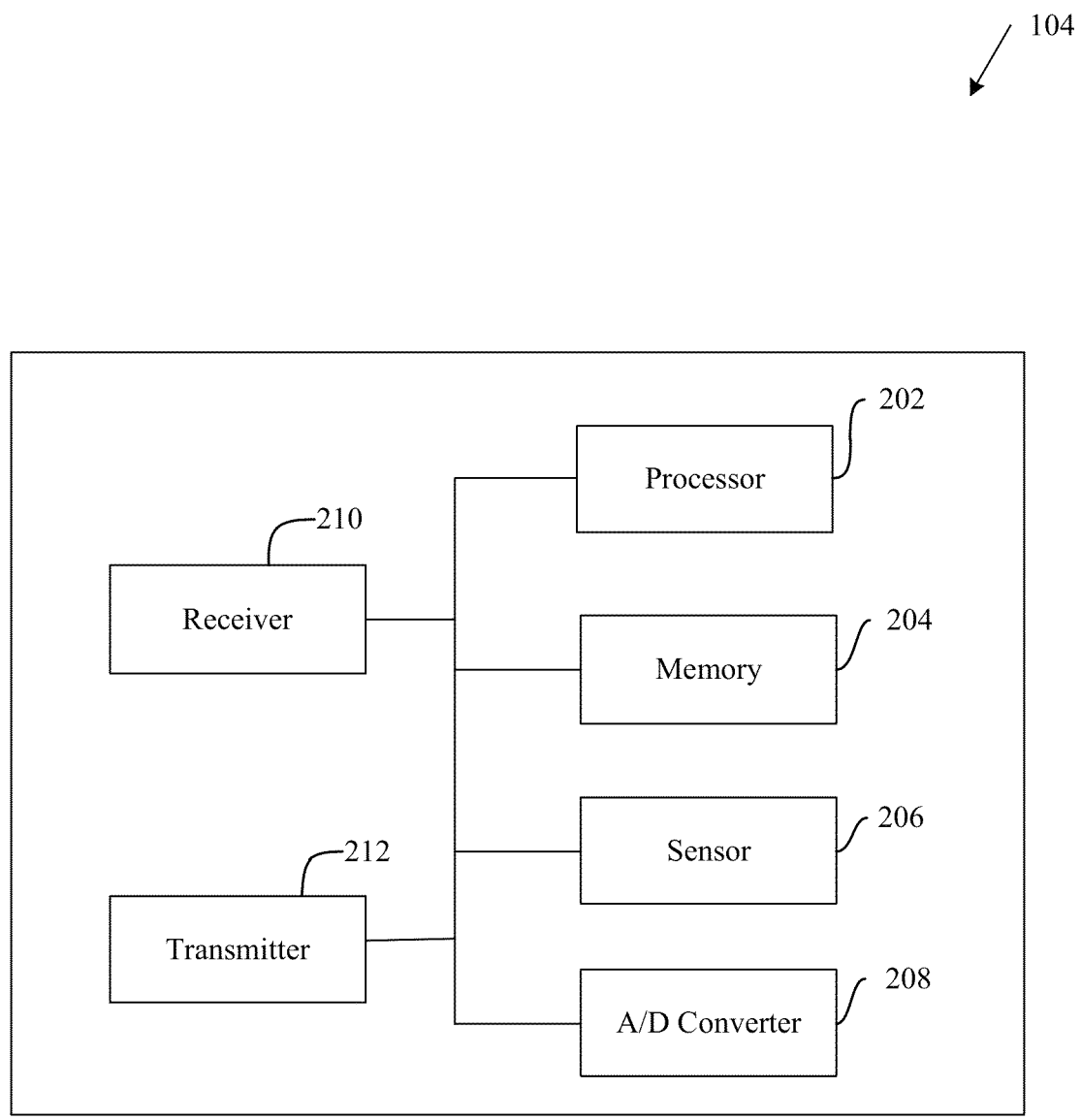
FIG. 2 is a block diagram of an exemplary apparatus for controlling a user interface of a device, in accordance with an embodiment of the disclosure.

FIG. 2 is a block diagram of an exemplary apparatus for controlling a user interface of a device, in accordance with an embodiment of the disclosure. The block diagram of FIG. 2 is described in conjunction with the block diagram of FIG. 1.

Referring to FIG. 2, there is shown the apparatus 104. The apparatus 104 may comprise one or more processors, such as a processor 202, a memory 204, one or more sensors, such as a sensor 206, an analog to digital converter 208 (hereinafter referred to as A/D converter 208), a receiver 210, and a transmitter 212.

The processor 202 may be communicatively coupled to the memory 204, the A/D converter 208, and the sensor 206. Further, the receiver 210 and the transmitter 212 may be communicatively coupled to the processor 202, the memory 204, the sensor 206, and the A/D converter 208.

The processor 202 may comprise suitable logic, circuitry, and/or interfaces that may be operable to execute at least one code section stored in the memory 204. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computer (CISC) processor.

The memory 204 may comprise suitable logic, circuitry, interfaces, and/or code that may be operable to store a machine code and/or a computer program having the at least one code section executable by the processor 202. Examples of implementation of the memory 204 may include, but are not limited to, Random Access Memory (RAM), Read Only Memory (ROM), Hard Disk Drive (HDD), and/or a Secure Digital (SD) card. The memory 204 may further be operable to store data, such as configuration settings of the apparatus 104, settings of the sensor 206, frequency-operation mapping data, and/or any other data.

The sensor 206 may comprise suitable logic, circuitry, interfaces, and/or code that may be operable to detect one or more vibrations of the vibratory surface 106. The one or more vibrations may be caused by an interaction of the object 108 with the vibratory surface 106. The sensor 206 may be operable to generate one or more vibratory signals in response to the detected one or more vibrations. Examples of the sensor 206 may include, but are not limited to, an accelerometer, a gyroscope, an ultra-sonic sensor, a microphone, and/or any sensor operable to detect vibrations of the vibratory surface 106 and generate vibratory signals in response to the detected vibrations.

In an embodiment, the sensor 206 may be an integral part of the apparatus 104. The apparatus 104 may be coupled to the vibratory surface 106 in such a manner that the sensor 206 may be in contact with the vibratory surface 106. In another embodiment, the sensor 206 may be external to the apparatus 104. The sensor 206 may be coupled to and/or embedded in the vibratory surface 106. In an embodiment, the apparatus 104 may be communicatively coupled to the sensor 206 via a wired or wireless communication medium. In an embodiment, a manufacturer of the apparatus 104 may specify position of the sensor 206 on the vibratory surface 106. In another embodiment, a user associated with the apparatus 104 may customize the position of the sensor 206 on the vibratory surface 106. Examples of the communication medium may include, but are not limited to, a Bluetooth network, a Wireless Fidelity (Wi-Fi) network, and/or a ZigBee network.

The A/D converter 208 may comprise suitable logic, circuitry, interfaces, and/or code that may be operable to convert a vibratory signal into a digital vibratory signal. Examples of the A/D converter 208 may include, but are not limited to, a Flash A/D converter, a Sigma-Delta A/D converter, a Dual slope A/D converter, and/or a Successive approximation A/D converter.

The receiver 210 may comprise suitable logic, circuitry, interfaces, and/or code that may be operable to receive data and messages. The receiver 210 may receive data in accordance with various known communication protocols. In an embodiment, the receiver 210 may receive the vibratory signal generated by the sensor 206 external to the apparatus 104. The receiver 210 may implement known technologies for supporting wired or wireless communication between the apparatus 104 and the sensor 206 external to the apparatus 104.

The transmitter 212 may comprise suitable logic, circuitry, interfaces, and/or code that may be operable to transmit data and/or messages. The transmitter 212 may transmit data, in accordance with various known communication protocols. In an embodiment, the transmitter 212 may transmit a control signal to control the user interface of the device 102.

In operation, the apparatus 104 may be coupled to the vibratory surface 106 such that the sensor 206 may be in contact with the vibratory surface 106. A user may interact with the vibratory surface 106 using the object 108. The apparatus 104 may allow a user to control the user interface of the device 102 based on the interaction with the vibratory surface 106. In an embodiment, a user may interact at any location on the entire vibratory surface 106 to control the user interface of the device 102. In another embodiment, a user may interact at any location within the pre-defined region of the vibratory surface 106 to control the user interface of the device 102. In an embodiment, a user may interact with the vibratory surface 106 using a finger. In another embodiment, a user may interact with the vibratory surface 106 using a nail of the finger. In another embodiment, a user may interact with the vibratory surface 106 using the skin of the finger.

In an embodiment, a user may scratch and/or tap at any location on the vibratory surface 106 using the object 108, such as the nail of the finger. In another embodiment, a user may slide and/or drag the object 108 across the vibratory surface 106. In another embodiment, a user may perform a gesture at any location on the vibratory surface 106 using the object 108. Examples of the gesture may include, but are not limited to, drawing a shape and/or drawing an alphanumeric character.

In response to the interaction of the object 108 with the vibratory surface 106, the sensor 206 may sense vibrations generated in the vibratory surface 106. The sensor 206 may generate one or more vibratory signals that correspond to the sensed vibrations. The processor 202 may generate a control signal that corresponds to the generated one or more vibratory signals to control the user interface of the device 102.

In an embodiment, the sensor 206 may be a 3-axis gyroscope. The 3-axis gyroscope may be operable to determine acceleration that corresponds to vibrations produced in the vibratory surface 106. The sensor 206 may be operable to generate the one or more vibratory signals that correspond to the determined acceleration.

The processor 202 may be operable to convert each of the generated one or more vibratory signals into vibratory signal components. Each converted vibratory signal component may correspond to a coordinate axis in a three-dimensional coordinate system. For example, a first vibratory signal component, of the converted vibratory signal components, may be along the X-axis of the three-dimensional coordinate system. A second vibratory signal component, of the converted vibratory signal components, may be along the Y-axis of the three-dimensional coordinate system. A third vibratory signal component, of the converted vibratory signal components, may be along the Z-axis of the three-dimensional coordinate system. Notwithstanding, the disclosure may not be so limited and the first vibratory signal component, the second vibratory signal component, and the third vibratory signal component may be along any of the X-axis, the Y-axis and the Z-axis of the three-dimensional coordinate system without limiting the scope of the disclosure.

In an embodiment, each of the first vibratory signal component, the second vibratory signal component, and the third vibratory signal component may be in an analog form. The A/D converter 208 may be operable to convert the first vibratory signal component, the second vibratory signal component, and the third vibratory signal component from the analog form into a digital form. In an embodiment, the first vibratory signal component, the second vibratory signal component, and the third vibratory signal component may be represented as signals in time domain.

The processor 202 may generate a first signal based on a difference between the first vibratory signal component and the second vibratory signal component. The processor 202 may generate a second signal based on a difference between one of the first vibratory signal component or the second vibratory signal component, and the third vibratory signal component. For example, the processor 202 may generate a first signal based on a difference between the second vibratory signal component along the Y-axis and the third vibratory signal component along the Z-axis. The processor 202 may generate a second signal based on a difference between the third vibratory signal component along the Z-axis and a first vibratory signal component along the X-axis. The processor 202 may determine a type of the interaction based on the generated first signal and the generated second signal. The processor 202 may determine a location that corresponds to the interaction with the vibratory surface 106 based on the generated first signal and the generated second signal.

In an embodiment, the processor 202 may generate a sample of the generated first signal during a first pre-determined duration. The processor 202 may generate a sample of the generated second signal during a second pre-determined duration. In an embodiment, the first pre-determined duration and the second pre-determined duration may be equal. In another embodiment, the first pre-determined duration and the second pre-determined duration may be different. In an embodiment, the processor 202 may generate the sample of each of the first generated signal and the second generated signal by applying a window function to time domain signals that correspond to each of the first generated signal and the second generated signal. Examples of such window functions may include, but are not limited to, a Hanning window function, a Hamming window function, a rectangular window function, a Gaussian window function, and/or other window functions. Notwithstanding, the disclosure may not be so limited and any method may be used to generate the sample of each of the first generated signal and the second generated signal, without limiting the scope of the disclosure.

The processor 202 may transform each of the generated samples of the first generated signal and the second generated signal from the time domain to the frequency domain. In an embodiment, the processor 202 may perform the transformation by applying a Fast Fourier Transformation to each of the generated samples of the first generated signal and the second generated signal. The processor 202 may normalize power of each of the transformed samples of the first generated signal and the second generated signal.

The processor 202 may determine a cross-correlation function between the transformed samples of the generated first signal and the generated second signal. In an embodiment, the processor 202 may determine the cross-correlation function by applying a Generalized Cross-Correlation (GCC) function using the Phase Transform (GCC-PHAT).

The processor 202 may transform the determined cross-correlation function from the frequency domain to the time domain. In an embodiment, the processor 202 may transform the determined cross-correlation function from the frequency domain to the time domain by applying an Inverse Fast Fourier Transformation.

In an embodiment, the processor 202 may determine the type of the interaction of the object 108 with the vibratory surface 106 based on the transformed cross-correlation function. In an embodiment, when the transformed cross-correlation function is at a maximum level, the processor 202 may determine the type of the interaction to be equivalent to scratching on the vibratory surface 106.

In an embodiment, the processor 202 may determine the location that corresponds to the interaction of the object 108 with the vibratory surface 106 based on the determined cross-correlation function. In an embodiment, the processor 202 may determine the location of the sensor 206 on the vibratory surface 106.

In an embodiment, the processor 202 may determine a vibration frequency that corresponds to each of the one or more vibratory signals generated by the sensor 206. The processor 202 may determine the vibration frequency based on one or more of: a material of the vibratory surface 106, a type of the object 108, a type of the interaction, and/or a roughness of the vibratory surface 106. The determined vibration frequency is indicative of an operation associated with the device 102.

The processor 202 may generate the control signal based on the determined vibration frequency. The control signal indicates an operation of the device 102 to be controlled in response to the interaction. The processor 202 may communicate the generated control signal to the device 102 via the transmitter 212. The device 102 may process the received control signal and perform the operation indicated by the control signal. In an embodiment, the processor 202 may determine a control signal that corresponds to the determined vibration frequency based on frequency-operation mapping data stored in the memory 204. The frequency-operation mapping data may specify an operation of the device 102 to be controlled in response to a vibration frequency of a vibratory signal.

In an embodiment, the frequency-operation mapping data may be pre-defined. In an embodiment, the manufacturer associated with the apparatus 104 may define an operation of the device 102 to be controlled that corresponds to a vibratory signal produced in response to an interaction of the object 108 with the vibratory surface 106. In another embodiment, a user operating the apparatus 104 may define an operation of the device 102 to be controlled that corresponds to a vibratory signal produced in response to an interaction of the object 108 with the vibratory surface 106. In an embodiment, the manufacturer and/or the user may define an operation of the device 102 to be controlled corresponding to a type of the interaction. For example, the manufacturer and/or the user may define the vibration frequency that corresponds to scratching on the vibratory surface 106 that may indicate volume control operation of a television. Hence, by scratching on the vibratory surface 106, a user may control volume of the television. In another embodiment, the manufacturer and/or the user may define an operation of the device 102 to be controlled corresponding to a location of the interaction on the vibratory surface 106. For example, the manufacturer and/or the user may define the vibration frequency that corresponds to tapping within a pre-defined region on the vibratory surface 106 that may indicate channel change operation of the television. Thus, by tapping within the pre-defined region on the vibratory surface 106, the user may change channels of the television. In another embodiment, a user may customize a pre-defined mapping defined by the manufacturer.

In an embodiment, a user may perform a gesture on the vibratory surface 106. To perform the gesture, a user may perform a plurality of interactions at a plurality of locations on the vibratory surface 106. The sensor 206 may generate a plurality of vibratory signals in response to the plurality of interactions. The processor 202 may determine a location that corresponds to each of the plurality of the vibratory signals. The processor 202 may identify the gesture based on the determined locations. The processor 202 may generate a control signal that corresponds to the determined gesture. For example, a user may interact with a home appliance by drawing a circle on the vibratory surface 106 by scratching. The processor 202 may generate a control signal that corresponds to the circle drawn. The control signal may switch on and/or switch off the home appliance.

In an embodiment, the apparatus 104 may be operable to interact with a plurality of devices using the vibratory surface 106. For example, the processor 202 may interact with a mobile device based on the generation of a control signal that corresponds to scratching on the vibratory surface 106. Similarly, the processor 202 may interact with a home appliance in response to a tap on the vibratory surface 106.

In an embodiment, the processor 202 may receive one or more configuration settings that correspond to the apparatus 104. Examples of the one or more configuration settings may include, but are not limited to, one or more settings associated with the sensor 206, a range of vibration frequencies that may correspond to an interaction of the object 108 with the vibratory surface 106, and/or one or more operations to be performed by the device 102 in response to an interaction of the object 108 with the vibratory surface 106. In an embodiment, the processor 202 may allow a user to configure one or more configuration settings. In another embodiment, the manufacturer of the apparatus 104 may specify the one or more configuration settings. The one or more configuration settings may be stored in the memory 204.

In an embodiment, the processor 202 may be operable to register one or more devices (such as the device 102). In an embodiment, the processor 202 may prompt a user to specify the one or more devices with which a user may interact using the apparatus 104. The processor 202 may register the one or more devices as specified by the user. In an embodiment, the processor 202 may communicate the generated control signal to the registered device.

In an embodiment, the processor 202 may search for one or more devices to interact with based on receiving an identification signal from the one or more devices. In another embodiment, the transmitter 212 may transmit the identification signal to the one or more devices. The processor 202 may receive an acknowledgement of the identification signal from the one or more devices. The processor 202 may register the one or more devices that may acknowledge the transmitted identification signal as the devices with which the apparatus 104 may interact. Examples of the identification signal may include, but are not limited to, a radio frequency signal, an infrared signal, an ultra high frequency signal, and the like. In an embodiment, the manufacturer of the apparatus 104 may specify the device 102 with which the apparatus 104 may interact.

Figure 3:
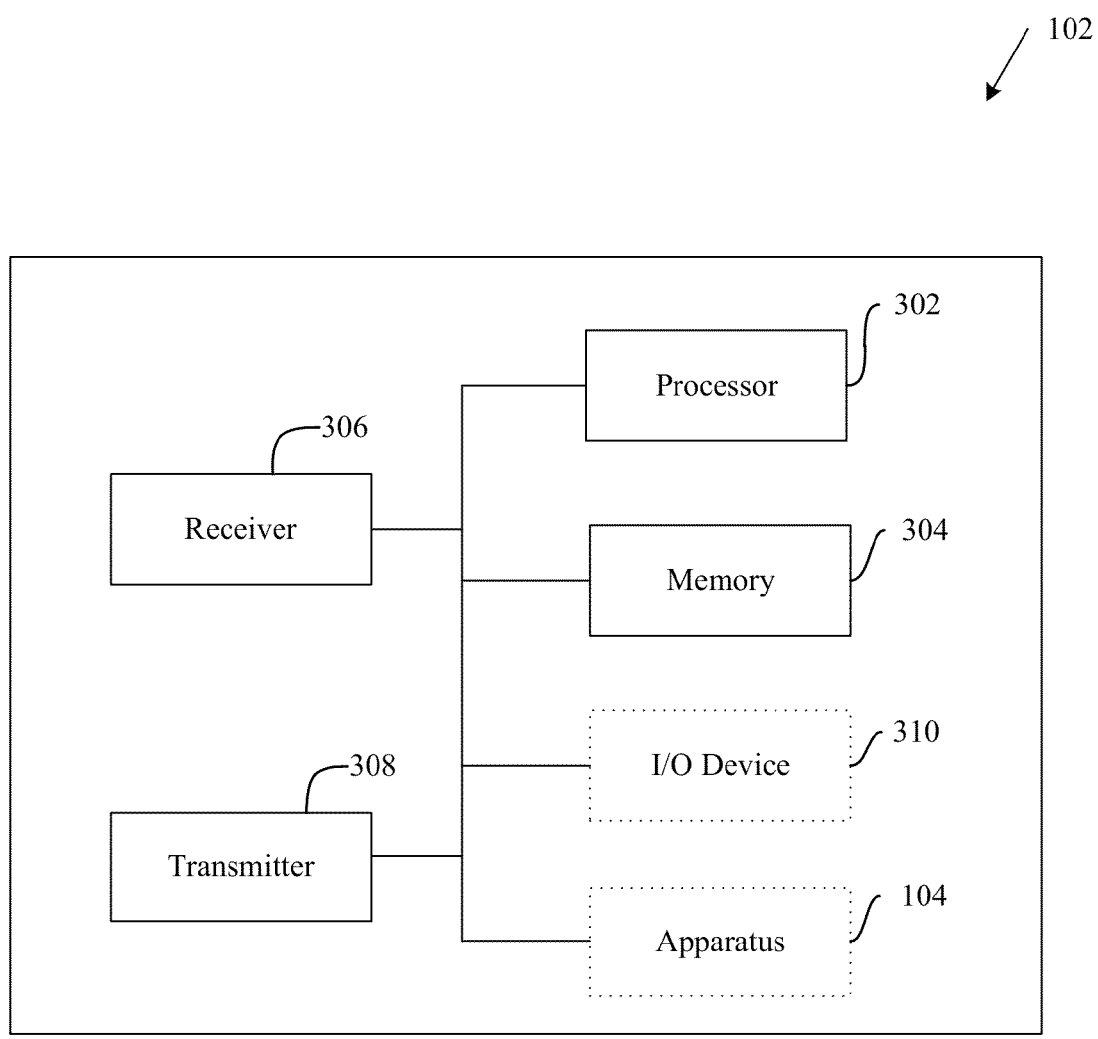
FIG. 3 is a block diagram of an exemplary device that may be controlled based on vibratory input, in accordance with an embodiment of the disclosure

FIG. 3 is a block diagram of an exemplary device that may be controlled based on vibratory input, in accordance with an embodiment of the disclosure. The block diagram of FIG. 3 is described in conjunction with the block diagram of FIG. 1 and FIG. 2.

Referring to FIG. 3, there is shown the device 102. The device 102 may comprise one or more processors and/or circuits, such as a processor 302, a memory 304, a receiver 306, and a transmitter 308, an input/output device 310 (hereinafter referred to as I/O device 310), and the apparatus 104. The I/O device 310 and the apparatus 104 may be optional as represented by dashed box in the block diagram of FIG. 3.

The processor 302 and/or the one or more circuits may be communicatively coupled to the memory 304, the receiver 306, the transmitter 308, and the I/O device 310.

The processor 302 and/or the one or more circuits may comprise suitable logic, circuitry, and/or interfaces that may be operable to execute at least one code section stored in the memory 304. The processor 302 may be implemented based on a number of processor technologies known in the art. Examples of the processor 302 may include, but are not limited to, an X86-based processor, a Reduced Instruction Set Computing (RISC) processor, an Application-Specific Integrated Circuit (ASIC) processor, and/or a Complex Instruction Set Computer (CISC) processor.

The memory 304 may comprise suitable logic, circuitry, interfaces, and/or code that may be operable to store a machine code and/or a computer program having the at least one code section executable by the processor 302. Examples of implementation of the memory 304 may include, but are not limited to, Random Access Memory (RAM), Read Only Memory (ROM), Hard Disk Drive (HDD), and/or a Secure Digital (SD) card. The memory 304 may further be operable to store data, such as configuration settings of the device 102, configuration settings of the apparatus 104, signal-operation mapping data, and/or any other data.

The receiver 306 may comprise suitable logic, circuitry, interfaces, and/or code that may be operable to receive data and messages. The receiver 306 may receive data in accordance with various known communication protocols. In an embodiment, the receiver 306 may receive a control signal from the apparatus 104. In another embodiment, the receiver 306 may receive an identification signal from the apparatus 104. The receiver 306 may implement known technologies for supporting wired or wireless communication with the apparatus 104 via a communication network.

The transmitter 308 may comprise suitable logic, circuitry, interfaces, and/or code that may be operable to transmit data and/or messages. The transmitter 308 may transmit data in accordance with various known communication protocols. In an embodiment, the transmitter 308 may transmit an identification signal to the apparatus 104.

The I/O device 310 may comprise various input and output devices that may be operably coupled to the processor 202. The I/O device 310 may comprise suitable logic, circuitry, interfaces, and/or code that may be operable to receive input from a user operating the device 102 and provide an output. Examples of the input devices may include, but are not limited to, a keypad, a stylus, and/or a touch screen. Examples of the output devices may include, but are not limited to, a display and a speaker.

In an embodiment, the apparatus 104 may be integrated with the device 102. In such a case, any surface associated with the device 102 may correspond to the vibratory surface 106 for the apparatus 104. In an embodiment, the body of the device 102 may correspond to the vibratory surface 106. For example, the cover of a remote control may be used as the vibratory surface 106 to interact with the remote control. A user operating the remote control may scratch on the cover of the remote control. The apparatus 104 may generate a control signal to control various operations of the remote control in response to scratching on the cover. In an embodiment, the entire body of the device 102 may be designated as the vibratory surface 106. In another embodiment, a pre-defined region of the body of the device 102 may be designated as the vibratory surface 106.

In another embodiment, a surface in contact with the device 102 may correspond to the vibratory surface 106. For example, a surface of a table on which a lamp is placed may be used as the vibratory surface 106 for interacting with the lamp. A user operating the lamp may scratch on the table. The apparatus 104 may generate a control signal in response to scratching on the table to switch on and/or switch off the lamp.

In operation, a user may interact with the vibratory surface 106 using the object 108. The apparatus 104 may detect one or more vibrations of the vibratory surface 106 caused by the interaction of the object 108 with the vibratory surface 106. The apparatus 104 may generate a control signal in response to detection of the one or more vibrations. The apparatus 104 may communicate the generated control signal to the processor 302 and/or the one or more circuits to control the user interface of the device 102. The processor 302 and/or the one or more circuits may receive the transmitted control signal from the apparatus 104 via the receiver 306. The received control signal may indicate an operation of the device 102 to be controlled in response to the interaction. The processor 302 and/or the one or more circuits may determine an operation of the device 102 to be controlled based on the received control signal. The processor 302 and/or the one or more circuits may control a user interface of the device 102 based on the determined operation.

In an embodiment, the processor 302 and/or the one or more circuits may determine the operation of the device 102 to be controlled based on the signal-operation mapping data stored in the memory 304. The signal-operation mapping data may specify an operation of the device 102 to be controlled corresponding to a received control signal. The signal-operation mapping data stored in the memory 304 of the device 102 may correspond to the frequency-operation mapping data stored in the memory 204 of the apparatus 104. In an embodiment, a user may store the signal-operation mapping data that corresponds to the frequency-operation mapping data in the memory 304. In another embodiment, the apparatus 104 may transmit the signal-operation mapping data that corresponds to the frequency-operation mapping data to the processor 302 and/or the one or more circuits.

Figure 4:
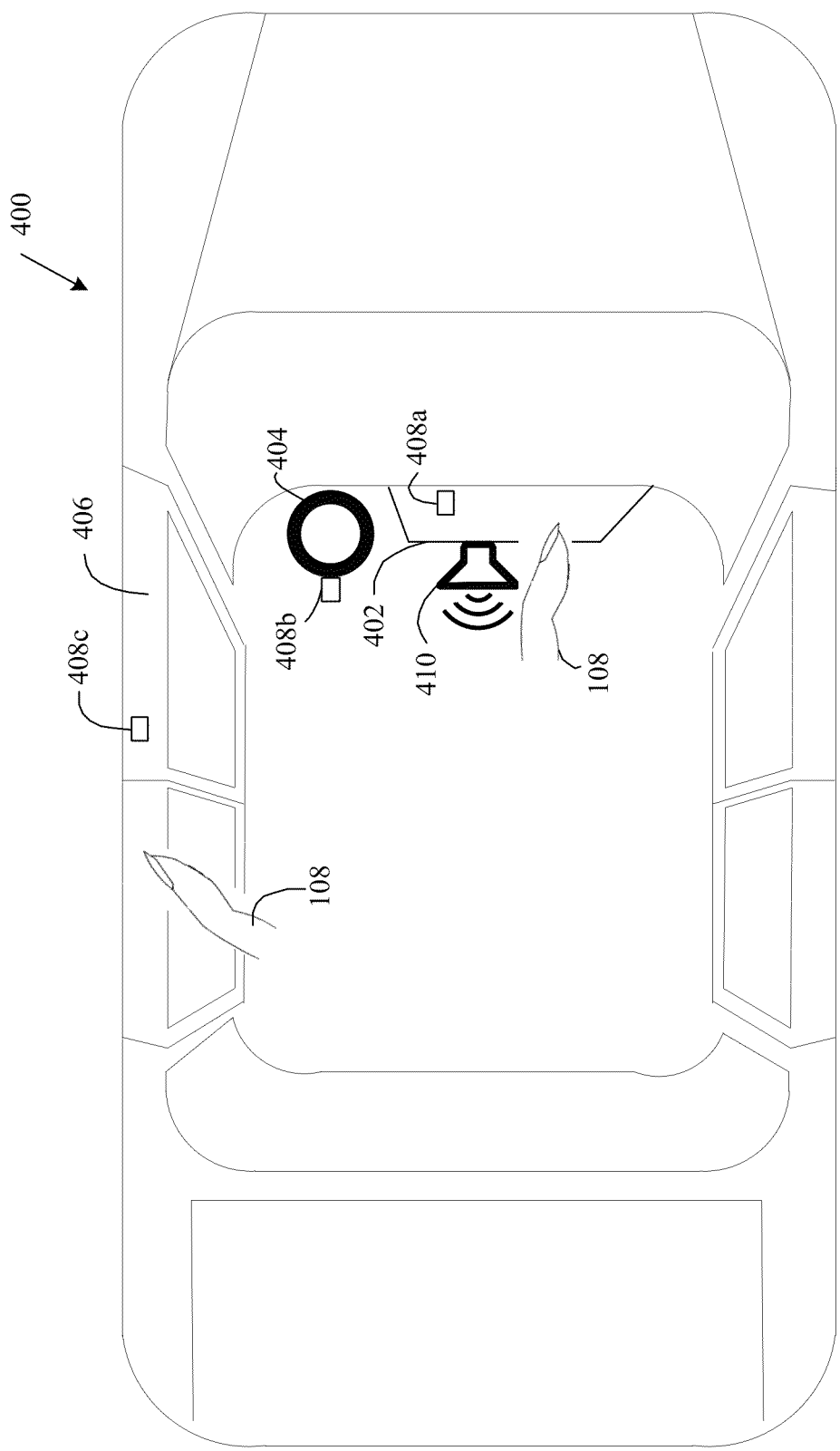
FIG. 4 is a diagram illustrating an example implementation of controlling a device within a vehicle, in accordance with an embodiment of the disclosure.

FIG. 4 is a diagram illustrating an example implementation of controlling a device within a vehicle, in accordance with an embodiment of the disclosure. The example implementation of controlling a device within a vehicle is described in conjunction with the block diagrams of FIG. 1, FIG. 2, and FIG. 3.

Referring to FIG. 4, there is shown a vehicle 400. The vehicle 400 may comprise a dashboard 402, a steering wheel 404, one or more doors such as a door 406, a first apparatus 408a, a second apparatus 408b, a third apparatus 408c, and a multimedia player 410. The first apparatus 408a, the second apparatus 408b, and the third apparatus 408c may be collectively referred to as the apparatus 408. The multimedia player 410 may be connected to the dashboard 402.

The apparatus 408 may comprise the components illustrated to be a part of the apparatus 104 and referred using the same reference numbers. The apparatus 408 is identical to the apparatus 104 with regard to the connection configuration of the components and the functional operation of the components. The apparatus 408 may be operable to interact with one or more devices in the vehicle 400. The dashboard 402, the steering wheel 404, the door 406, and the multimedia player 410 may be examples of the one or more devices with which the apparatus 408 may interact.

In an embodiment, the first apparatus 408a may be coupled to the dashboard 402. The second apparatus 408b may be coupled to the steering wheel 404. The third apparatus 408c may be coupled to the door 406. Notwithstanding, the disclosure may not be so limited and the apparatus 408 may be coupled to any part of the vehicle 400 without limiting the scope of the disclosure. Although FIG. 4 shows three apparatuses for interacting with the one or more devices in the vehicle 400 (such as the first apparatus 408a, the second apparatus 408b, and the third apparatus 408c) for simplicity, one skilled in the art may appreciate that the disclosed embodiments may be implemented for any number of devices.

The surface of the dashboard 402, the steering wheel 404, and/or the door 406 may correspond to the vibratory surface 106. In an embodiment, the entire surface of the dashboard 402, the steering wheel 404, and/or the door 406 may correspond to the vibratory surface 106. In another embodiment, a pre-defined region of the surface of the dashboard 402, the steering wheel 404, and/or the door 406 may correspond to the vibratory surface 106. The manufacturer associated with the vehicle 400 may specify the pre-defined region that corresponds to the vibratory surface 106. A user associated with the vehicle 400 may perform interactions on the surface of the dashboard 402, the steering wheel 404, and/or the door 406 using the object 108, such as a finger.

A user may interact with the surface of the dashboard 402, the steering wheel 404, and/or the door 406 to control various operations of the vehicle 400. The interaction may cause vibration of the surface of the dashboard 402, the steering wheel 404, and/or the door 406. The sensor 206 of the apparatus 408 may detect the vibration and generate one or more vibratory signals in response to the detected vibration. The processor 202 of the apparatus 408 may generate a control signal that corresponds to the one or more generated vibratory signals to control the various operations of the vehicle 400. The processor 202 may control the various operations of the vehicle 400 according to the generated control signal.

For example, a user associated with the vehicle 300 may interact with the dashboard 402 to control the multimedia player 410 coupled to the dashboard 402. For example, a user may scratch on the dashboard 402 to start playback of an audio on the multimedia player 410. In another example, a user may draw a 'U' shape by scratching on the dashboard 402. The 'U' shape drawn by scratching may increase the volume of the multimedia player 410, for example. Similarly, drawing a D' shape by sliding on the dashboard 402 may decrease the volume of the multimedia player 410, for example.

In another example, tapping with finger nails on the steering wheel 404 may switch on the engine of the vehicle 400. Similarly, by scratching on the steering wheel 404, a user may switch off the engine of the vehicle 400. In another example, by drawing various shapes by scratching and/or sliding on the steering wheel 404, a user may adjust side view mirrors and/or a back view mirror of the vehicle 400. In another example, by scratching on the door 406 a user may open and/or close a window of the vehicle 400. Notwithstanding, the disclosure may not be so limited and a user may interact with different parts of the vehicle 400 in various ways to control different operations of the vehicle 400 without limiting the scope of the disclosure.

Figure 5:
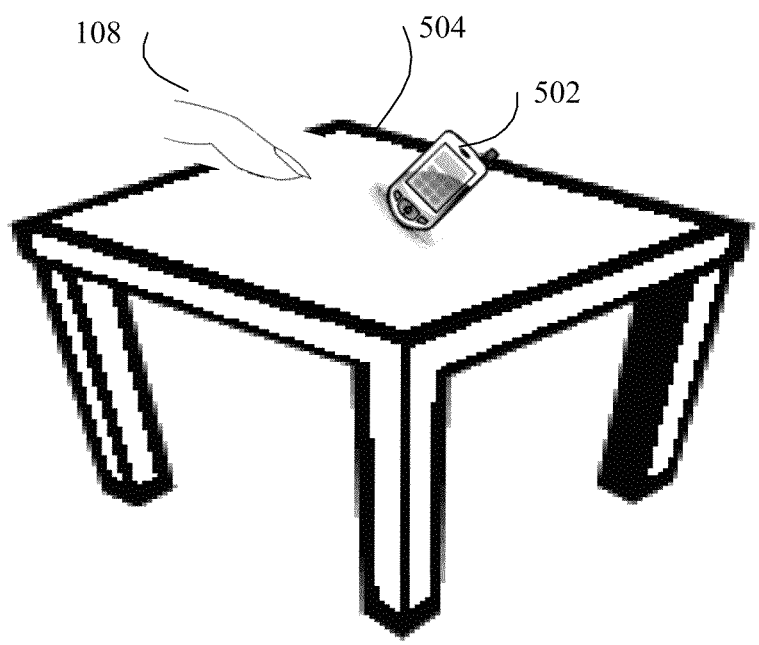
FIG. 5 is a diagram illustrating an example implementation of controlling a mobile phone based on vibratory input, in accordance with an embodiment of the disclosure.

FIG. 5 is a diagram illustrating an example implementation of controlling a mobile phone based on vibratory input, in accordance with an embodiment of the disclosure. The example implementation of controlling a mobile phone is described in conjunction with the block diagrams of FIG. 1, FIG. 2, and FIG. 3.

Referring to FIG. 5, there is shown a mobile phone 502 and a table 504. The mobile phone 502 may be placed on the table 504, for example. The apparatus 104 may be coupled to the table 504 (not shown in FIG. 5). In an embodiment, the apparatus 104 may be fixed under the table top. Notwithstanding, the disclosure may not be so limited and the apparatus 104 may be connected to other parts of the table 504 without limiting the scope of the disclosure. The apparatus 104 may be operable to interact with the mobile phone 502.

The table 504 may correspond to the vibratory surface 106. In an embodiment, the entire surface of the table 504 may correspond to the vibratory surface 106. In another embodiment, a pre-defined region of the table 504 may correspond to the vibratory surface 106. A user associated with the mobile phone 502 may perform interactions on the surface of the table 504 using the object 108, such as a finger, to control a user interface of the mobile phone 502. For example, the user may scratch on the table 504 using the finger nail to control the user interface of the mobile phone 502. Scratching on the table 504 may cause vibration on the table 504. The sensor 206 of the apparatus 104 may detect the vibration caused on the table 504. The sensor 206 may generate one or more vibratory signals in response to the detected vibration of the table 504. The processor 202 of the apparatus 104 may determine a vibration frequency that corresponds to each of the one or more vibratory signals associated with the scratching. Based on the determined vibration frequency, the processor 202 may generate a control signal to control the user interface of the mobile phone 502. The apparatus 104 may communicate the control signal to the mobile phone 502. For example, the control signal may correspond to a command to switch off the mobile phone 502. Based on the received control signal, the mobile phone 502 may be switched off.

In another example implementation, a wall on which a lamp is fixed may correspond to the vibratory surface 106. The apparatus 104 may be coupled to the wall. A user may draw a 'V' shape by sliding the object 108, such as a finger, on the wall. The processor 202 may determine a first vibration frequency that corresponds to the 'V' shape drawn by sliding the skin of the finger. Similarly, a user may draw an 'S' shape by scratching on the wall using the finger nail. The processor 202 may determine a second vibration frequency that corresponds to the 'S' shape drawn by scratching on the vibratory surface 106. The processor 202 may determine a first control signal based on the first determined vibration frequency and a second control signal based on the second vibration frequency. The first control signal may be indicative of a first operation to be performed by the lamp. The second control signal may be indicative of a second operation to be performed by the lamp. For example, the 'S' shape drawn by scratching on the wall may switch on the lamp. Similarly, the 'S' shape drawn by sliding the finger on the wall may switch off the lamp.

In another example implementation, a table on which a laptop is placed may correspond to the vibratory surface 106. The apparatus 104 may be coupled to the bottom surface of the table. A user may tap at any location on the table using the object 108, such as the nail of the finger. The processor 202 may determine a vibration frequency that corresponds to the tapping performed using the finger nail. The processor 202 may generate a control signal that corresponds to the tapping using the finger nail. The generated control signal that corresponds to the tapping may indicate a right button of a mouse associated with the laptop. Similarly, a user may tap at any location on the table using the skin of the finger. The processor 202 may determine a vibration frequency that corresponds to the tapping performed using the skin of the finger. The processor 202 may generate a control signal that corresponds to the tapping using the skin of the finger. The generated control signal that corresponds to the tapping using the skin of the finger may indicate a left button of the mouse associated with the laptop, for example.

Notwithstanding, the disclosure may not be limited only to the above example implementations of the vibratory surface 106, interactions, and/or the device 102 that can be controlled. Any surface may be used as the vibratory surface 106 for interacting with different types of devices using various types of interactions without limiting the scope of the disclosure.

Figure 6A:
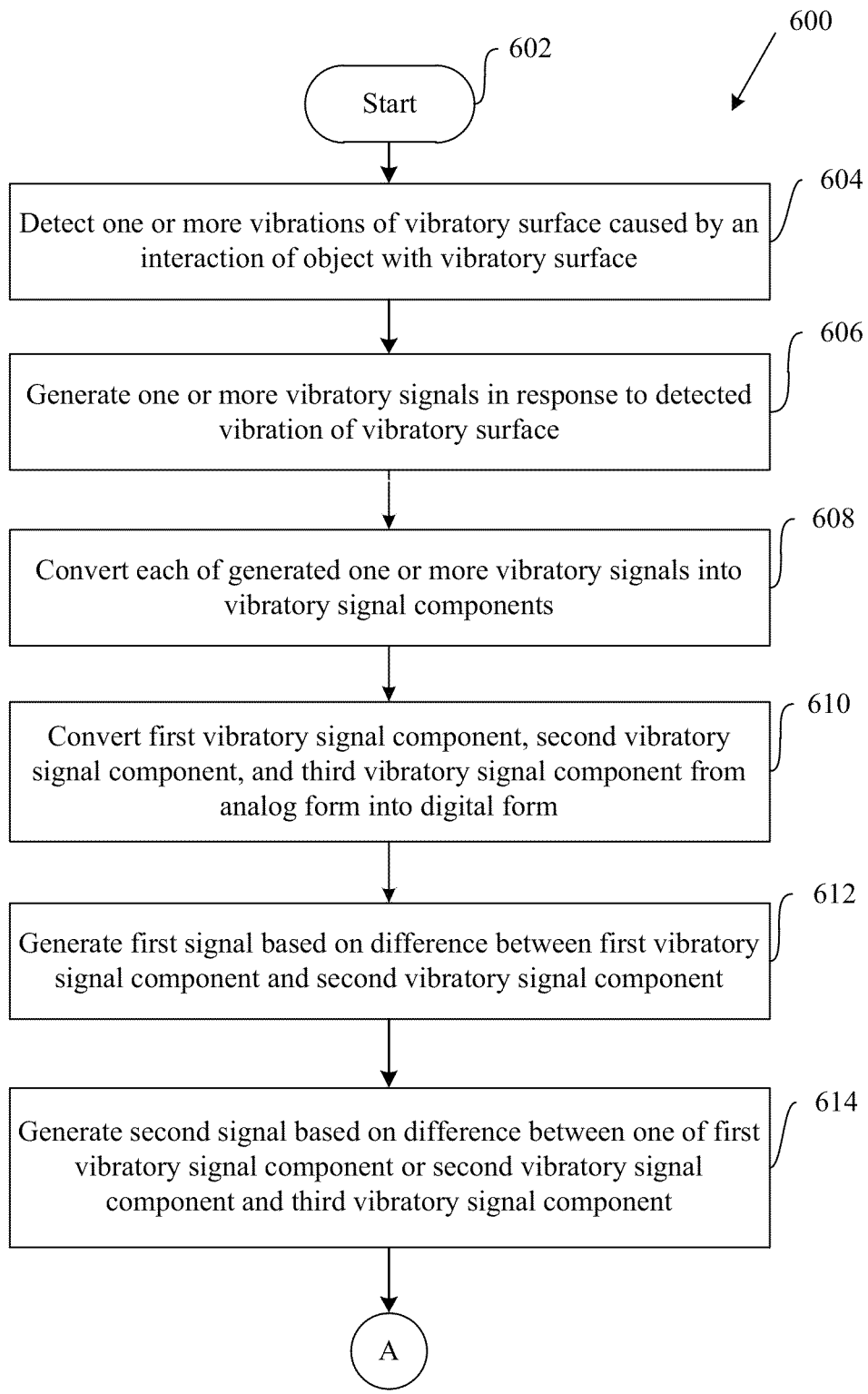
FIGS. 6A, 6B, and 6C are flow charts illustrating exemplary steps for generating a control signal in an apparatus for controlling a user interface of a device based on vibratory input, in accordance with an embodiment of the disclosure.
Figure 6B:
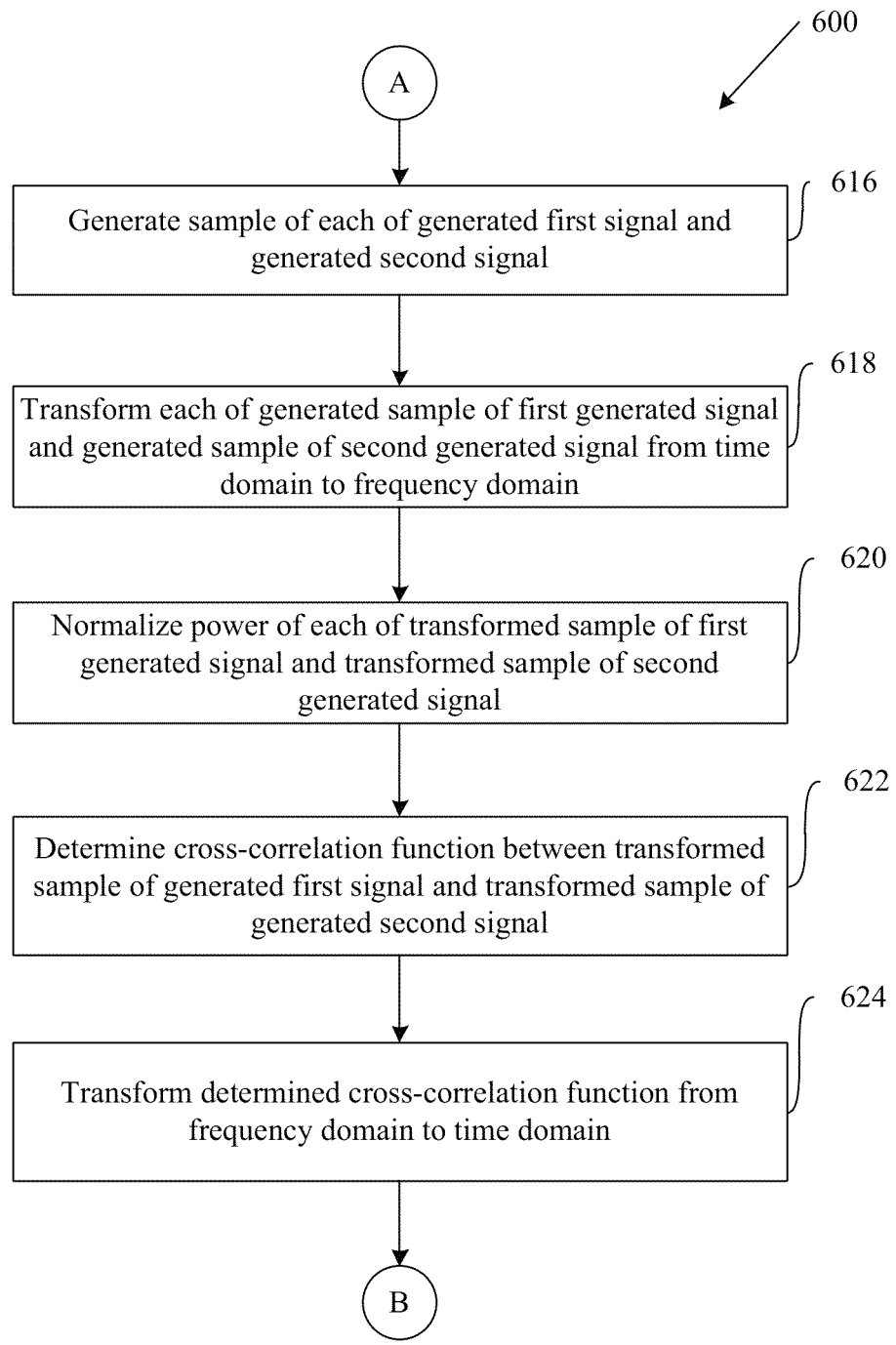
Figure 6C:
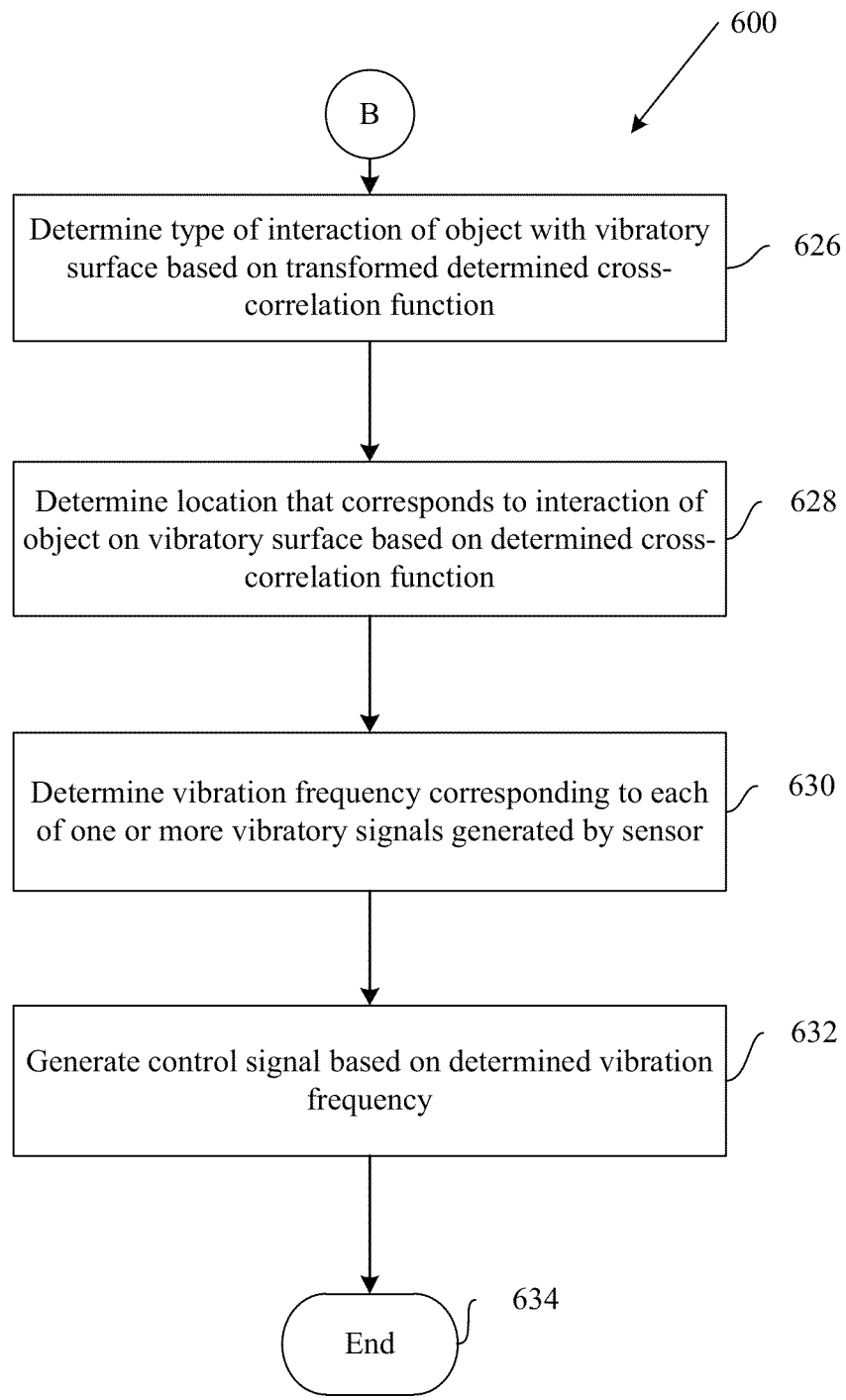

FIGS. 6A, 6B, and 6C are flow charts illustrating exemplary steps for generating a control signal in an apparatus for controlling a user interface of a device based on vibratory input, in accordance with an embodiment of the disclosure. Referring to FIGS. 6A, 6B, and 6C, there is shown a method 600. The method 600 is described in conjunction with the block diagram of FIG. 1 and FIG. 2.

Exemplary steps begin at step 602. At step 604, the sensor 206 may detect one or more vibrations of the vibratory surface 106 caused by an interaction of the object 108 with the vibratory surface 106. At step 606, the sensor 206 may generate one or more vibratory signals in response to the detected vibration of the vibratory surface 106. At step 608, the processor 202 may convert each of the generated one or more vibratory signals into vibratory signal components. Each converted vibratory signal component may correspond to a coordinate axis in a three-dimensional coordinate system. At step 610, the A/D converter 208 may convert the first vibratory signal component, the second vibratory signal component, and the third vibratory signal component from analog form into a digital form. At step 612, the processor 202 may generate a first signal based on a difference between the first vibratory signal component and the second vibratory signal component. At step 614, the processor 202 may generate a second signal based on a difference between one of the first vibratory signal component or the second vibratory signal component and the third vibratory signal component. At step 616, the processor 202 may generate a sample of each of the generated first signal and the generated second signal. The processor 202 may generate the sample of the generated first signal during a first pre-determined duration. The processor 202 may generate the sample of the generated second signal during a second pre-determined duration. At step 618, the processor 202 may transform each of the generated sample of the first generated signal and the generated sample of the second generated signal from the time domain to the frequency domain. At step 620, the processor 202 may normalize power of each of the transformed sample of the first generated signal and the transformed sample of the second generated signal. At step 622, the processor 202 may determine a cross-correlation function between the transformed sample of the generated first signal and the transformed sample of the generated second signal. At step 624, the processor 202 may transform the determined cross-correlation function from the frequency domain to the time domain. At step 626, the processor 202 may determine the type of the interaction of the object 108 with the vibratory surface 106 based on the transformed cross-correlation function. At step 628, the processor 202 may determine the location that corresponds to the interaction of the object 108 on the vibratory surface 106 based on the determined cross-correlation function. At step 630, the processor 202 may determine a vibration frequency that corresponds to each of the one or more vibratory signals generated by the sensor 206. At step 632, the processor 202 may generate a control signal based on the determined vibration frequency. The control signal may correspond to the one or more generated vibratory signals to control the user interface of the device 102. The method 600 ends at step 634.

Although various embodiments of the disclosure have been described with reference to implementation in an apparatus and/or a method for controlling a user interface of a device, the disclosure may not be so limited. Various embodiments of the disclosure may also be implemented in apparatuses and methods performing other operations without limiting the scope of the disclosure. An example of such operation may be detecting presence of a user and/or an object in any given area, such as a room. Another example may be determining a direction of movement of an object and/or a user in a room. Based on the detected presence, the detected movement, and/or the detected direction of movement, one or more operations of one or more devices present in the room may be controlled.

In an embodiment, the apparatus 104 may be implemented to control a device within a room based on vibrations produced in a floor, a wall, and/or a roof of the room. The apparatus 104 may be operable to interact with one or more devices in the room. A lamp 704 and/or a fan may be examples of a device with which the apparatus 104 may interact.

In an embodiment, the apparatus 104 may be coupled to a floor of a room. For example, the apparatus 104 may be embedded in the floor such that the sensor 206 may be operable to detect one or more vibrations of the floor. Notwithstanding, the disclosure may not be so limited and the apparatus 104 may be placed above the floor without limiting the scope of the disclosure. In an embodiment, a single apparatus may interact with one or more devices in a room. In another embodiment, each device in a room may be controlled by a separate apparatus.

The floor may correspond to the vibratory surface 106. Vibrations may be produced on the floor when a user walks on the floor and/or move an object (such as a chair) across the floor. The sensor 206 of the apparatus 104 may detect the vibration and generate one or more vibratory signals in response to the detected vibration. The processor 202 of the apparatus 104 may generate a control signal that corresponds to the one or more generated vibratory signals to determine the direction of movement of a user and/or an object. The processor 202 may control the various devices (such as a lamp and a fan) in the room according to the generated control signal. For example, when a user walks out of a room, vibrations are produced in the floor. The sensor 206 may detect the vibration produced in the floor. Based on the detected vibrations, the processor 202 may determine a direction of movement of the user. Based on the determined direction of motion, the processor 202 may determine that the user is moving out of the room. Based on the determination, the processor 202 may switch off a lamp and/or a fan.

In another example, based on one or more vibratory signals generated by the sensor 206, the processor 202 may determine that a user is entering a room. In response, the processor 202 may generate a control signal to control operation of a lamp and a fan. The processor 202 may switch on a lamp and/or a fan. Notwithstanding, the disclosure may not be so limited and various other movements of a user in a room may be determined without limiting the scope of the disclosure.

In another example, the apparatus 104 may be operable to detect movement of objects, such as a table, a chair, and other objects in a room. The sensor 206 may detect the vibration produced in the floor by movement of a table, for example. Based on the detected movement, the processor 202 may be operable to determine environmental changes, such as an earthquake and/or a cyclone.

In accordance with an embodiment of the disclosure, an apparatus 104 (FIG. 1) for controlling a user interface of a device 102 (FIG. 1) may comprise one or more sensors, such as a sensor 206 coupled to a vibratory surface 106 (FIG. 1) associated with the apparatus 104. The one or more sensors may be operable to detect one or more vibrations of the vibratory surface 106 caused by an interaction of an object 108 (FIG. 1) with the vibratory surface 106. The one or more sensors may be operable to generate one or more vibratory signals in response to the detected one or more vibrations. The apparatus 104 may further comprise one or more processors, such as a processor 202 (FIG. 2) communicatively coupled to the one or more sensors. The one or more processors may be operable to generate a control signal that corresponds to the one or more generated vibratory signals to control the user interface of the device 102.

The one or more processors may be operable to convert each of the generated one or more vibratory signals into vibratory signal components. Each of the converted vibratory signal components corresponds to a coordinate axis in a three-dimensional coordinate system. The one or more processors may be operable to generate a first signal based on a difference between a first vibratory signal component and a second vibratory signal component of the three converted vibratory signal components. The one or more processors may be operable to generate a second signal based on a difference between one of the first vibratory signal component or the second vibratory signal component and a third vibratory signal component of the converted three vibratory signal components. The one or more processors may be operable to determine the interaction of the object based on the generated first signal and the generated second signal. The one or more processors may be operable to determine a location that corresponds to the interaction of the object with the vibratory surface 106. The location is determined based on the generated first signal and the generated second signal.

The one or more processors may be operable to transform a sample of the generated first signal during a first pre-determined duration from a time domain to a frequency domain. The one or more processors may be operable to transform a sample of the generated second signal during a second pre-determined duration from the time domain to the frequency domain. The one or more processors may be operable to determine a cross-correlation between the transformed sample of the generated first signal and the transformed sample of the generated second signal. The one or more processors may be operable to determine the location based on the determined cross-correlation. The one or more processors may be operable to determine a vibration frequency that corresponds to each of the generated one or more vibratory signals. The determined vibration frequency is indicative of an operation associated with the device 102. The vibration frequency is determined based on one or more of a material of the vibratory surface 106, a type of the object 108, a type of the interaction, and/or a roughness of the vibratory surface 106.

The interaction may comprise one or more of scratching the vibratory surface 106, tapping on the vibratory surface 106, sliding the object 108 on the vibratory surface 106, and/or dragging the object 108 on the vibratory surface 106. The one or more sensors may comprise one or both of: an accelerometer or a gyroscope.

In accordance with an embodiment of the disclosure, a device 102 (FIG. 1) for interaction may comprise one or more processors, such as a processor 302 (FIG. 3) and/or circuits. The device 102 is communicatively coupled to an apparatus 104 (FIG. 1). The one or more processors and/or circuits may be operable to receive a control signal from the apparatus 104. The control signal may be generated by the apparatus 104 in response to detection of one or more vibrations of a vibratory surface 106 (FIG. 1) associated with the apparatus 104 caused by an interaction of an object 108 (FIG. 1) with the vibratory surface 106. The one or more processors and/or circuits may be operable to control a user interface of the device 102 based on the received control signal. The interaction may comprise one or more of scratching the vibratory surface 106, tapping on the vibratory surface 106, sliding the object 108 on the vibratory surface 106, and/or dragging the object 108 on the vibratory surface 106.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising detecting one or more vibrations of a vibratory surface caused by an interaction of an object with the vibratory surface. One or more vibratory signals may be generated in response to the detected one or more vibrations. A control signal may be generated corresponding to the one or more generated vibratory signals to control the user interface of the device.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An apparatus for controlling a user interface of a device, said apparatus comprising:
    one or more sensors coupled to a vibratory surface associated with said apparatus, wherein said one or more sensors are operable to:
        detect one or more vibrations of said vibratory surface caused by an interaction of an object with said vibratory surface; and
        generate one or more vibratory signals in response to said detected one or more vibrations; and
    one or more processors communicatively coupled to said one or more sensors, wherein said one or more processors are operable to:
        generate a control signal corresponding to said one or more generated vibratory signals to control said user interface of said device;
        convert each of said generated one or more vibratory signals into vibratory signal components, wherein each of said converted vibratory signal components corresponds to a coordinate axis in a three-dimensional coordinate system;
        generate a first signal based on a difference between a first vibratory signal component and a second vibratory signal component of said converted vibratory signal components;
        generate a second signal based on a difference between one of said first vibratory signal component or said second vibratory signal component, and a third vibratory signal component of said converted vibratory signal components; and
        determine said interaction of said object based on said generated first signal and said generated second signal.

2. The apparatus of claim 1, wherein said one or more processors are operable to determine a location corresponding to said interaction of said object with said vibratory surface, wherein said location is determined based on said generated first signal and said generated second signal.

3. The apparatus of claim 2, wherein said one or more processors are operable to:
    transform a sample of said generated first signal during a first pre-determined duration from a time domain to a frequency domain; and
    transform a sample of said generated second signal during a second pre-determined duration from said time domain to said frequency domain.

4. The apparatus of claim 3, wherein said one or more processors are operable to determine a cross-correlation between said transformed sample of said generated first signal and said transformed sample of said generated second signal.

5. The apparatus of claim 4, wherein said one or more processors are operable to determine said location based on said determined cross-correlation.

6. The apparatus of claim 1, wherein said one or more processors are operable to determine a vibration frequency corresponding to each of said generated one or more vibratory signals, wherein said determined vibration frequency is indicative of an operation associated with said device.

7. The apparatus of claim 6, wherein said vibration frequency is determined based on one or more of: a material of said vibratory surface, a type of said object, a type of said interaction, and/or a roughness of said vibratory surface.

8. The apparatus of claim 1, wherein said interaction comprises one or more of: scratching said vibratory surface, tapping on said vibratory surface, sliding said object on said vibratory surface, and/or dragging said object on said vibratory surface.

9. The apparatus of claim 1, wherein said one or more sensors comprise one or both of: an accelerometer or a gyroscope.

10. A method for controlling a user interface of a device, said method comprising:
    detecting one or more vibrations of a vibratory surface caused by an interaction of an object with said vibratory surface;
    generating one or more vibratory signals in response to said detected one or more vibrations;
    generating a control signal corresponding to said one or more generated vibratory signals to control said user interface of said device;
    converting each of said generated one or more vibratory signals into vibratory signal components, wherein each of said converted vibratory signal components corresponds to a coordinate axis in a three-dimensional coordinate system;
    generating a first signal based on a difference between a first vibratory signal component and a second vibratory signal component of said converted vibratory signal components;
    generating a second signal based on a difference between one of said first vibratory signal component or said second vibratory signal component and a third vibratory signal component of said converted vibratory signal components; and
    determining said interaction of said object based on said generated first signal and said generated second signal.

11. The method of claim 10, further comprising determining a location corresponding to said interaction of said object with said vibratory surface, wherein said location is determined based on said generated first signal and said generated second signal.

12. The method of claim 10, further comprising:
    generating a sample of said generated first signal during a first pre-determined duration;
    generating a sample of said generated second signal during a second pre-determined duration; and
    transforming each of said generated samples of said generated first signal and said generated second signal from a time domain to a frequency domain.

13. The method of claim 12, wherein each of said samples of said generated first signal and said generated second signal is generated by applying a window function to each of said generated first signal and said generated second signal.

14. The method of claim 12, further comprising determining a cross-correlation between said transformed sample of said generated first signal and said transformed sample of said generated second signal.

15. The method of claim 14, further comprising determining said location and/or said interaction based on said determined cross-correlation.

16. The method of claim 10, further comprising determining a vibration frequency corresponding to each of said generated one or more vibratory signals based on one or more of: a material of said vibratory surface, a type of said object, a type of said interaction, and/or a roughness of said vibratory surface, wherein said determined vibration frequency is indicative of an operation associated with said device.

17. A device for interaction, said device comprising:
one or more processors and/or circuits in said device that is communicatively coupled to an apparatus, wherein said one or more processors and/or circuits are operable to:
receive a control signal from said apparatus, wherein said control signal is generated by said apparatus in response to detection of one or more vibrations of a vibratory surface associated with said apparatus caused by an interaction of an object with said vibratory surface, wherein said interaction is detected by said apparatus based on a first signal and a second signal, wherein said first signal is generated based on a difference between a first vibratory signal component and a second vibratory signal component of vibratory signal components obtained from one or more vibratory signals, wherein said second signal is generated based on a difference between one of said first vibratory signal component or said second vibratory signal component, and a third vibratory signal component of said vibratory signal components, wherein said one or more vibratory signals are generated in response to said detection of one or more vibrations; and
control a user interface of said device based on said received control signal.

18. The device of claim 17, wherein said interaction comprises one or more of: scratching said vibratory surface, tapping on said vibratory surface, sliding said object on said vibratory surface, and/or dragging said object on said vibratory surface.

* * * * *